United States Patent
Lee et al.

(10) Patent No.: US 6,808,163 B2
(45) Date of Patent: Oct. 26, 2004

(54) MODIFIED BLADES FOR PROCESS CHAMBER THROTTLE VALVE

(75) Inventors: Ta-Chin Lee, Taichun (TW); Kun-Yi Chen, Tainan (TW); Hue-Ming Kuo, Chiai (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 53 days.

(21) Appl. No.: 10/371,480

(22) Filed: Feb. 20, 2003

(65) Prior Publication Data

US 2004/0164267 A1 Aug. 26, 2004

(51) Int. Cl.[7] .............................................. F16K 1/22
(52) U.S. Cl. ...................................................... 251/305
(58) Field of Search ................................ 251/118, 120, 251/121, 305, 356; 123/336, 337

(56) References Cited

U.S. PATENT DOCUMENTS

| | | | | |
|---|---|---|---|---|
| 3,299,869 A | * | 1/1967 | Sicklesteel | ............... 123/90.27 |
| 5,669,350 A | * | 9/1997 | Altmann et al. | ............. 123/337 |
| 6,491,020 B2 | * | 12/2002 | Kotchi et al. | ................ 123/337 |
| 6,557,826 B2 | * | 5/2003 | Moore et al. | ................ 251/305 |

* cited by examiner

Primary Examiner—Edward K. Look
Assistant Examiner—John K. Fristoe, Jr.
(74) Attorney, Agent, or Firm—Tung & Associates

(57) ABSTRACT

The valve blades of the present invention facilitate delayed onset and gradual or fine variations in the flow of gas through the throttle valve to achieve a process interval of interior chamber gas pressures over a broader valve blade step range, achieve aggressive PI over a broad range for enhanced tool throughput, enhance stability of interior chamber gas pressures during substrate processing, and increase tool uptime and production efficiency. In one embodiment, each of the two valve blades in the throttle valve includes at least one, and typically, multiple notches or gaps for a delayed onset, and finely-graded increase, in flow of gas through the valve throughout the step range of the valve blades. In another embodiment, the semicircular valve blades have a cam-shaped configuration and are capable of varying the radius of the circle defined by the two blades.

20 Claims, 3 Drawing Sheets

MODIFIED BLADES FOR PROCESS CHAMBER THROTTLE VALVE

FIELD OF THE INVENTION

The present invention relates to valves for regulating chamber pressures of process chambers used in the fabrication of semiconductor integrated circuits. More particularly, the present invention relates to multi-unit pressure control valves for the rapid and accurate attainment of interior chamber gas pressures of process chambers such as etch chambers and CVD chambers.

BACKGROUND OF THE INVENTION

Integrated circuits are formed on a semiconductor substrate, which is typically composed of silicon. Such formation of integrated circuits involves sequentially forming or depositing multiple electrically conductive and insulative layers in or on the substrate. Chemical vapor deposition (CVD) processes are widely used to form layers of materials on a semiconductor wafer. CVD processes include thermal deposition processes, in which a gas is reacted with the heated surface of a semiconductor wafer substrate, as well as plasma-enhanced CVD processes, in which a gas is subjected to electromagnetic energy in order to transform the gas into a more reactive plasma. Forming a plasma can lower the temperature required to deposit a layer on the wafer substrate, to increase the rate of layer deposition, or both.

After the material layers are formed on the wafer substrate, etching processes may be used to form geometric patterns in the layers or vias for electrical contact between the layers. Etching processes include "wet" etching, in which one or more chemical reagents are brought into direct contact with the substrate, and "dry" etching, such as plasma etching. Various types of plasma etching processes are known in the art, including plasma etching, reactive ion (RI) etching and reactive ion beam etching. In each of these plasma processes, a gas is first introduced into a reaction chamber and then plasma is generated from the gas. This is accomplished by dissociation of the gas into ions, free radicals and electrons by using an RF (radio frequency) generator, which includes one or more electrodes. The electrodes are accelerated in an electric field generated by the electrodes, and the energized electrons strike gas molecules to form additional ions, free radicals and electrons, which strike additional gas molecules, and the plasma eventually becomes self-sustaining. The ions, free radicals and electrons in the plasma react chemically with the layer material on the semiconductor wafer to form residual products which leave the wafer surface and thus, etch the material from the wafer.

Referring to the schematic of FIG. 1, an etch reactor 30, such as an eMax etch reactor available from Applied Materials, Inc. of Santa Clara, Calif., includes a grounded reaction chamber 32, typically fitted with liners (not shown) to protect the interior wall surfaces thereof. A wafer 34 is inserted into the chamber 32 typically through a slit valve opening 36 and is placed on a cathode pedestal 38 having an electrostatic chuck 40 that clamps the wafer 34 in place. A cooling fluid circulates through cooling channels (not shown) in the pedestal 38 to control the temperature of the pedestal 38, and thus, the temperature of the wafer 34. A thermal transfer gas such as helium may be supplied to grooves (not shown) provided in the upper, wafer-supporting surface of the pedestal 38. The thermal transfer gas enhances the efficiency of thermal coupling between the pedestal 38 and the wafer 34.

An RF power supply 42 is connected to the cathode pedestal 38 and generates the etchant plasma while controlling the DC self-bias. Magnetic coils 44 encircle the chamber 32 and generate a slowly-rotating, horizontal, essentially DC magnetic field to increase the intensity of the plasma. A vacuum pump 46 pumps the gaseous contents of the chamber 32 through an adjustable throttle valve 48. Shields 50, 52 may serve to both protect the chamber 32 and pedestal 38 from the etchant plasma and define a pumping channel 54 connected to the throttle valve 48.

Processing gases are supplied from gas sources 58, 60, 62 through respective mass flow controllers 64, 66, 68 to a quartz gas distribution plate 70 positioned in the top of the chamber 32 overlying and separated from the wafer 34 across a processing region 72. The gas distribution plate 70 includes a manifold 74 that receives the processing gas and communicates with the processing region 72 through a showerhead having a large number of distributed apertures 76 which facilitate a substantially uniform flow of processing gas into the processing region 72.

By regulating the flow of gases from the interior of the vacuum chamber 32 to the vacuum pump 46, the throttle valve 48 of the etch reactor 30 is typically used to control the interior pressures of the chamber 32. As shown in FIGS. 2 and 3, the throttle valve 48 typically contains a valve frame 78 having a circular valve opening 79. A pair of adjacent valve blades 80 is pivotally mounted in the valve opening 79, and each of the valve blades 80 is operably engaged by a stepper motor (not shown). As shown in FIG. 2, in the closed position the valve blades 80 are disposed in coplanar relationship to each other and interlock to close the valve opening 79. As shown in FIG. 3, upon flow of gases 81 from the vacuum chamber 32 to the vacuum pump 46, the valve blades 80 are pivoted from the coplanar configuration to angled positions in stepwise fashion, thereby opening the valve opening 79 to varying degrees and regulating the rate of flow of the gas from the vacuum chamber 32 to the vacuum pump 46, and thus, the interior pressure of the chamber 32. The valve blades 80 can typically be incrementally opened throughout a range of finely-graded "steps" from 0 (in which the valve blades 80 are disposed in substantially coplanar relationship, or 0 degrees, with respect to the planar surface 82 of the valve frame 78), through 800 (in which the valve blades 80 are disposed at a substantially 90-degree angle with respect to the planar surface 82). The "0" step corresponds to the configuration of the valve blades 80 at which the valve opening 79 presents no area for gas flow, whereas the "800" step corresponds to the configuration of the valve blades 80 at which the valve opening 79 presents the largest area for gas flow through the throttle valve 48.

Referring next to the graph of FIG. 4, wherein the area of the valve opening 79 available for flow of gas through the throttle valve 48 is plotted on the Y axis as a function of the various step positions of the valve blades 80, which are plotted along the x axis. It can be seen from the graph that a typical etch process is carried out in the chamber 32 when the valve blades 80 are between steps 10 and 45. In this relatively narrow process region interval, which begins when the valve blades 80 are close to the 0-step position, PI is aggressive and pressures in the chamber 32 are optimal for the etch process; on either side of the process region interval, pressures in the chamber 32 fluctuate rapidly and are unstable. Accordingly, a throttle valve is needed which is characterized by a wider process region interval that begins at a higher valve blade step to enhance pressure stability and maintain aggressive PI over a broader valve blade step range to increase throughput of wafers through the chamber and prolong hardware lifetime.

An object of the present invention is to provide new and improved blades for a throttle valve used in conjunction with a process chamber for substrate processing.

Another object of the present invention is to provide new and improved throttle valve blades which facilitate a broader process interval for the processing of substrates.

Still another object of the present invention is to provide new and improved throttle valve blades which enhance stability in chamber pressures during the processing of substrates.

Yet another object of the present invention is to provide new and improved throttle valve blades which maintain aggressive PI throughout a broader operational range of a process chamber for substrates.

A still further object of the present invention is to provide new and improved throttle valve blades for a throttle valve on a process chamber, which throttle valve blades increase tool throughput.

Yet another object of the present invention is to provide new and improved throttle valve blades which include notches provided therein to facilitate delayed onset and gradual variations in the rate of gas flow through a throttle valve throughout the step range of the valve blades.

Still another object of the present invention is to provide new and improved throttle valve blades the radius of which may be varied to facilitate delayed onset and gradual variations in the rate of gas flow through a throttle valve.

SUMMARY OF THE INVENTION

In accordance with these and other objects and advantages, the present invention is generally directed to new and improved valve blades for a throttle valve which is typically used to control gas pressures in a process chamber for substrates. The valve blades of the present invention facilitate delayed onset and gradual or fine variations in the flow of gas through the throttle valve to achieve a process interval of interior chamber gas pressures over a broader valve blade step range, achieve aggressive PI over a broad range for enhanced tool throughput, enhance stability of interior chamber gas pressures during substrate processing, and increase tool uptime and production efficiency. In one embodiment, each of the two valve blades in the throttle valve includes at least one, and typically, multiple notches or gaps for a delayed onset, and finely-graded increase, in flow of gas through the valve throughout the step range of the valve blades. The notches or gaps may have a rectangular cross-section or a triangular cross-section.

In another embodiment, the semicircular valve blades have a cam-shaped configuration and are capable of varying the radius of the circle defined by the two blades as the blades are stepped between the closed and fully-opened positions. Due to the unique configuration of the valve blades, flow of gas through the throttle valve is characterized by delayed onset of gas flow through the valve upon initial stepped opening of the valve blades, as well as gradual or finely-graded increases in flow of the gas through the throttle valve throughout the process interval to enhance pressure stabilization, tool uptime and production capability.

BRIEF DESCRIPTION OF THE DRAWINGS

The invention will now be described, by way of example, with reference to the accompanying drawings, in which.

DESCRIPTION OF THE PREFERRED EMBODIMENTS

The present invention is generally directed to valve blades for a throttle valve which is typically used to control gas pressures in a process chamber for substrates. The invention has particularly beneficial utility in the stabilization of operational chamber pressures for an etch chamber used in the etching of material layers on a semiconductor wafer substrate during the fabrication of integrated circuits on the substrate. However, the invention is not so limited in application, and while references may be made to such etch chamber, the present invention is more generally applicable to stabilizing chamber pressures in a variety of industrial and mechanical applications.

Figure 1:
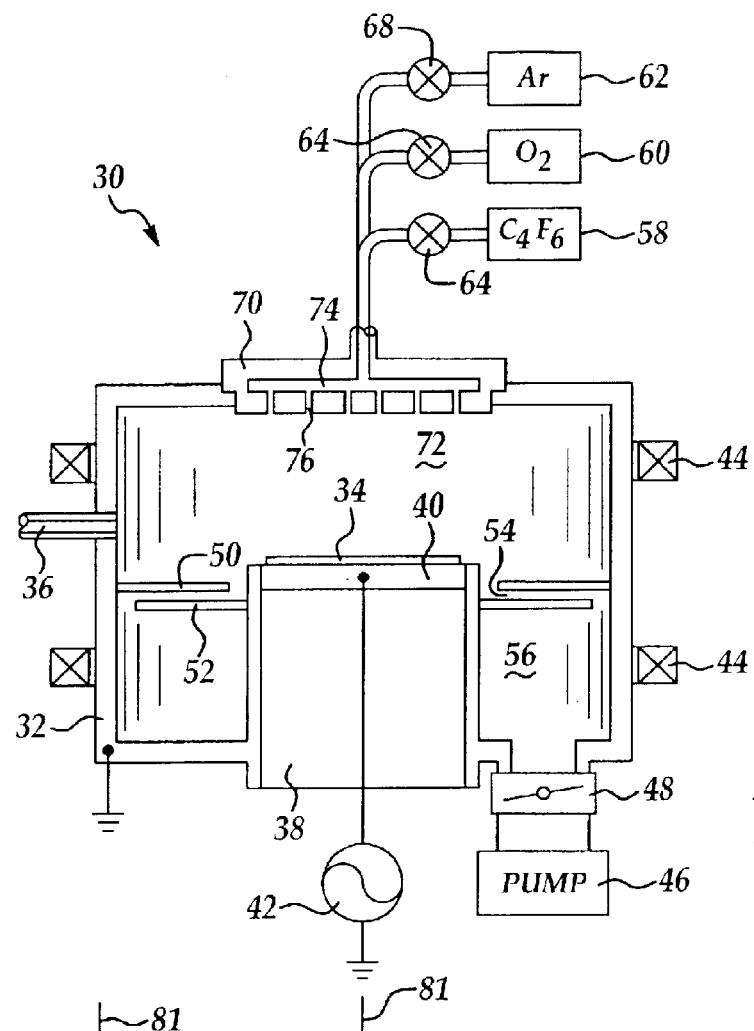
FIG. 1 is a schematic view of a typical conventional plasma etching system, suitable for implementation of the present invention.
Figure 2:
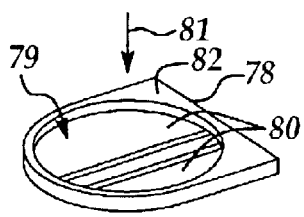
FIG. 2 is a perspective view of a pair of valve blades of a conventional throttle valve for a plasma etching system, with the valve blades in the closed position.
Figure 3:
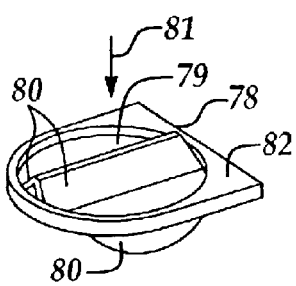
FIG. 3 is a perspective view of a pair of valve blades of a conventional throttle valve for a plasma etching system, with the valve blades in the open position.
Figure 4:
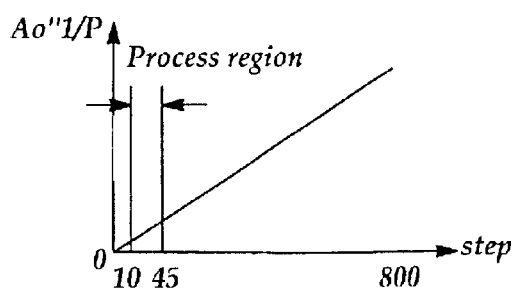
FIG. 4 is a graph wherein the area of the valve opening available for flow of gas through the conventional throttle valve is plotted on the Y axis, as a function of the various step positions of the valve blades in the throttle valve, plotted along the X axis.
Figure 5:
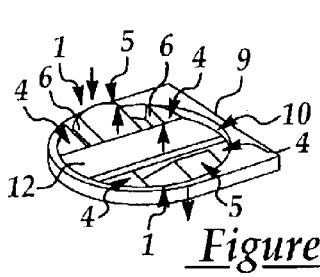
FIG. 5 is a perspective view of a pair of valve blades in a first embodiment of the present invention.
Figure 6:
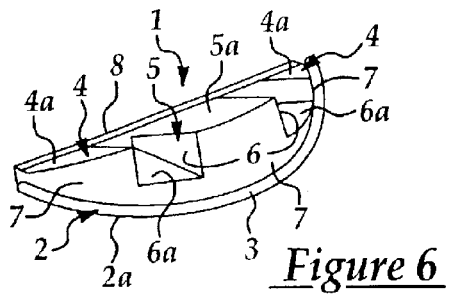
FIG. 6 is a rear view of one of the valve blades of the pair of valve blades shown in FIG. 5.
Figure 7A:
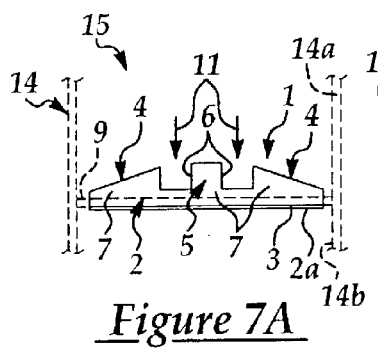
FIG. 7A is a schematic view illustrating a zero-step or closed position of the valve blades of FIG. 6.
Figure 7B:
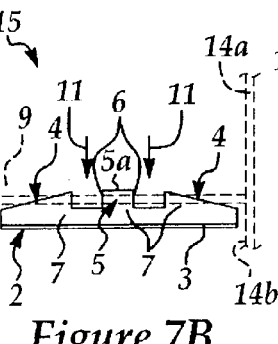
FIG. 7B is a schematic view illustrating a 100-step open position of the valve blades of FIG. 6, in implementation of the present invention.
Figure 7C:
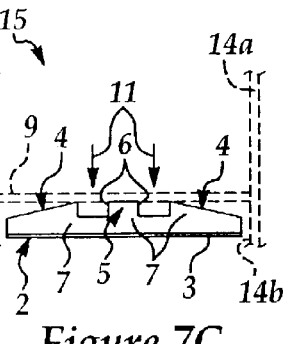
FIG. 7C is a schematic view illustrating a 300-step open position of the valve blades of FIG. 6, in implementation of the present invention.
Figure 8:
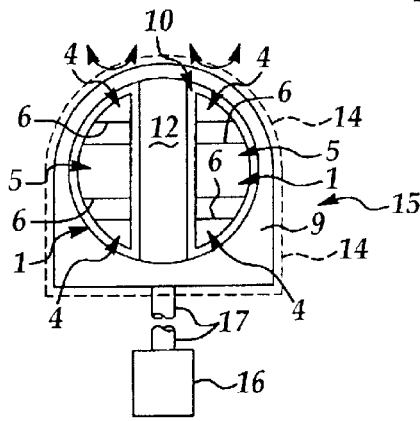
FIG. 8 is a top view of the valve blades of FIG. 5.

Referring to FIGS. 5–8, a first embodiment of a throttle valve 15 of the present invention is shown in FIG. 8 and is typically installed in a gas outlet conduit or opening (not shown) of an etch chamber (not shown) such as an eMAX etch chamber available from Applied Materials, Inc., of Santa Clara, Calif. A vacuum pump (not shown) is provided in fluid communication with the throttle valve 15 for drawing etchant gases and by-products from the chamber, through the throttle valve 15. The throttle valve 15 includes a generally planar valve frame 9 that is mounted in a valve housing 14, having an inlet end 14a confluently connected to the etch chamber (not shown) and an outlet end 14b confluently connected to the vacuum pump (not shown). A circular valve opening 10 extends through the valve frame 9, and an elongated blade mount member 12 bisects the valve opening 10, dividing the valve opening 10 into two semicircular openings of substantially equal area. A valve blade 1 is mounted in each of the two semicircular portions of the valve opening 10, on respective sides of the blade mount member 12. As shown in FIG. 6, each valve blade 1 includes a blade body 2 having a substantially flat or planar outlet surface 2a. A mount flange 8 extends along the straight front edge of the blade body 2 and is pivotally attached to the blade mount member 12, according to the knowledge of those skilled in the art. As shown in FIG. 8, a stepper motor 16 operably engages each blade body 2 through a motor shaft 17, according to the knowledge of those skilled in the art, for stepwise pivoting of the valve blades 1 in the valve opening 10. A curved sealing surface 7 on each valve body 2 slidably and sealingly engages the valve frame 9 at the edge of the valve opening 10 as the valve body 2 is pivoted in the valve opening 10, as hereinafter further described. A rear flange 3 extends along the arcuate rear edge of the valve body 2 and removably engages the bottom surface of the valve frame 9 when the valve body 2 is disposed in the closed position in the valve opening 10, as shown in FIG. 7A and hereinafter described.

A pair of spaced-apart gas flow gaps 6 is provided in the valve body 2, defining a pair of lateral protrusions 4 and a middle protrusion 5 that are separated from each other by the gas flow gaps 6. Each of the lateral protrusions 4 includes a generally sloped inlet surface 4a, and the middle protrusion 5a likewise includes a generally sloped inlet surface 5a. As shown in FIG. 6, each of the gas flow gaps 6 may have a generally rectangular cross-sectional configuration. The convex seal surface 7 extends between the rear flange 3 and the gap bottom 6a of each gas flow gap 6. The seal surface 7 further defines the rear surface of the middle protrusion 5 and each lateral protrusion 4.

Referring next to FIGS. 7A–7C, the stepper motor 16 is capable of rotating or pivoting each valve blade 1 throughout a range of steps typically from 0 to 800. At step 0 of the stepper motor 16, the outlet surface 2a of the blade body 2 is disposed in coplanar relationship with the outlet surface 2a of the valve frame 9 and the rear flange 3 engages the outlet surface 2a, as shown in FIG. 7A. At step 0, the valve opening 10, being completely closed by the valve blades 1, presents no area for flow of gas 11 through the throttle valve 15. At step 800 of the stepper motor 16, the outlet surface 2a of the blade body 2 is disposed at a substantially 90-degree angle with respect to the valve frame 9, and the valve opening 10 thus presents the maximum area available for flow of the gas 11 through the throttle valve 15. As the stepper motor 16 pivots the respective valve blades 1 in stepwise fashion from step 0, the mount flange 8 of each blade body 2 pivots on the blade mount member 12 as the convex seal surface 7 slidably and sealably engages the valve frame 9 at the concave edge of the valve opening 10, until the gap bottom 6a of each gas flow gap 6 is eventually displaced beyond the bottom surface of the valve frame 9, as shown in FIG. 7B. In a preferred embodiment, at step 100 of the stepper motor 16 the valve frame 9 is disposed about midway between the gap bottom 6a and the inlet surface 5a of the middle protrusion 5, as further shown in FIG. 7B. This facilitates flow of the gas 11 past the valve plate 9 through the gas flow gaps 6. Continued stepwise pivoting of the valve blades 1 from step 100 to step 300 results in complete clearing of the gas flow gaps 6 beyond the valve frame 9 in incremental fashion for eventual unrestricted flow of the gas 11 through the respective gas flow gaps 6, as shown in FIG. 7C. This unrestricted flow of the gas 11 through the gas flow gaps 6 occurs at step 300 of the stepper motor 16, wherein the inlet surface 5a of the middle protrusion 5 is located at the level of the bottom surface of the valve frame 9.

Figure 9:
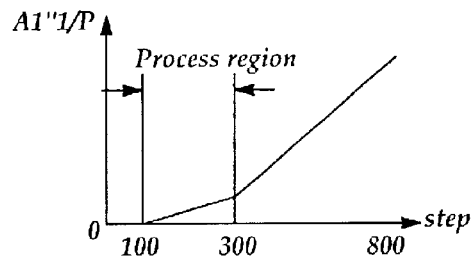
FIG. 9 is a graph wherein the area of the valve opening available for flow of gas through the valve blades of FIG. 5 is plotted along the Y axis, as a function of the various step positions of the valve blades, plotted along the X axis.

Referring next to the graph of FIG. 9, wherein the area of the valve opening 10 available for flow of the gas 11 through the throttle valve 15 is plotted along the Y axis, as a function of the various step positions of the valve blades 1, plotted along the X axis. It can be seen from the graph that the process region interval, corresponding to the stepped positions of the valve blades 1 in which the interior chamber pressures are optimum for carrying out an etching process, occurs between step 100 and step 300 of the stepper motor 16. This process region interval is broader than that which can be achieved using conventionally-shaped valve blades, and moreover, presents both a delayed onset of gas flow and gradual increase in available gas flow area through the throttle valve over the range of the process region interval. These characteristics promote aggressive PI and stability in the interior chamber pressures, resulting in enhanced tool throughput and efficiency.

Figure 10:
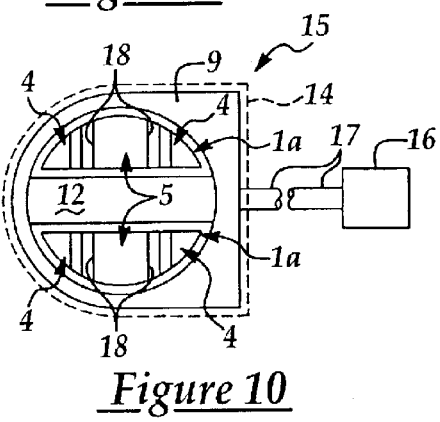
FIG. 10 is a top view of a pair of valve blades in a second embodiment of the present invention.
Figure 11:
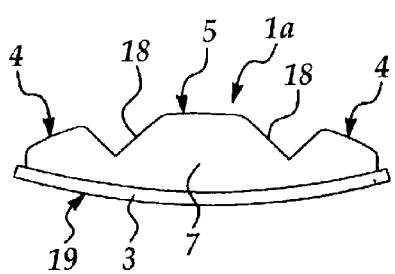
FIG. 11 is a rear view of one of the pair of valve blades in the second embodiment of the invention illustrated in FIG. 10.
Figure 12:
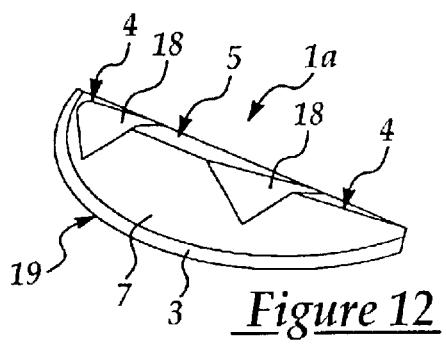
FIG. 12 is a rear perspective view of the valve blade illustrated in FIG. 11.
Figure 13:
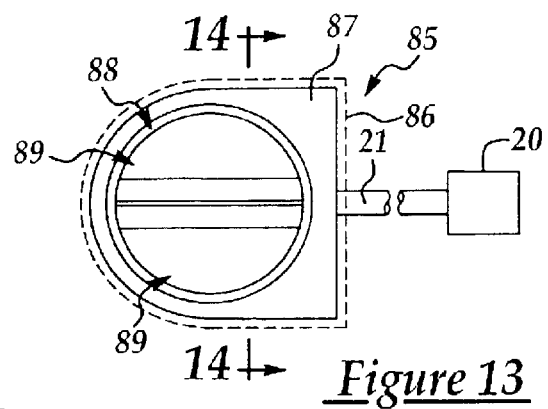
FIG. 13 is a top view of a third embodiment of the valve blades of the present invention.

Referring next to FIGS. 10–12, in another embodiment of the throttle valve 15, the blade body 19 of each valve blade 1a includes gas flow gaps 18 each having a generally triangular-shaped cross-section. Like the valve blades 1 of FIGS. 5–8, the gas flow gaps 18 separate a middle protrusion 5 from a pair of lateral protrusions 4. The triangular shape of the gas flow gaps 18 provide a smaller area for gas flow at step 100 as compared to the rectangular cross-sectional gas flow gaps 6 of the valve blades 1, and thus, provide a more gradual change in the rate of gas flow through the throttle valve 15, enhancing chamber pressure stabilization.

Referring next to FIGS. 13–16, in another embodiment of the invention, the valve blades 89 are mounted in a circular valve opening 88 of a valve frame 87. The valve frame 87 is mounted in a valve housing 86 of a throttle valve 85. Each of a pair of parallel plate mount shafts 98, engaged by a motor shaft 21 of a stepper motor 20 and spanning the valve opening 88, is capable of stepwise rotation by operation of the stepper motor 20, as hereinafter described. A circular frame flange 87a extends from the valve frame 87 and circumscribes the valve opening 88.

Figure 14A:
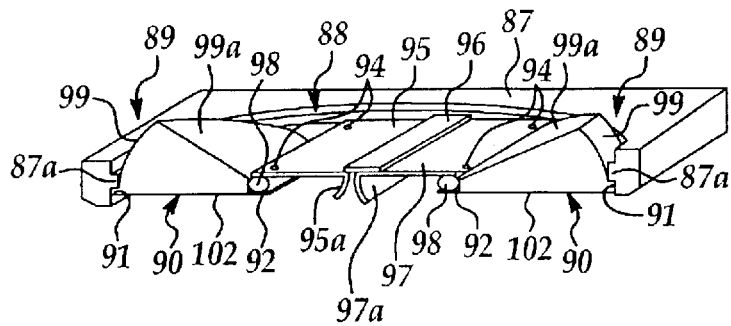
FIG. 14A is a cross-sectional view, taken along section lines 14—14 in FIG. 13, with the valve blades shown in the closed or 0-step position.
Figure 15:
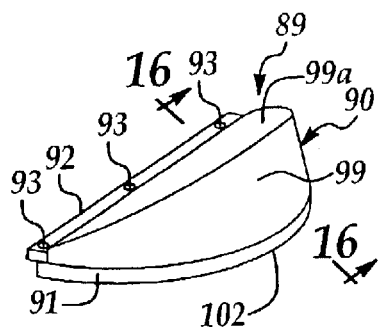
FIG. 15 is a rear perspective view of a valve blade element of the third embodiment of the present invention illustrated in FIG. 13.
Figure 16:
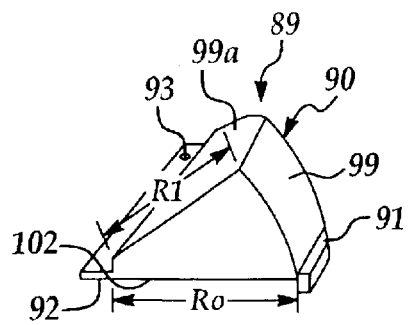
FIG. 16 is a cross-sectional view, taken along section line 16—16 in FIG. 15.

As shown in FIG. 15, each of the valve blades 89 includes a semicircular, cam-shaped blade body 90 that has a curved rear flange 91 which extends along the convex bottom rear edge, and a straight plate flange 92 which extends along the straight front edge, of the blade body 90. The blade body 90 further includes a convex sealing surface 99 which extends above the rear flange 91, a sloped, flat inlet surface 99a which extends between the plate flange 92 and the upper edge of the sealing surface 99, and a flat or planar outlet surface 102. Fastener openings 93 provided at spaced intervals in the plate flange 92 receive respective fasteners 94 that fasten the plate flange 92 of each blade body 90 to the corresponding plate mount shaft 98 in the valve opening 88, as shown in FIG. 14A. The convex sealing surface 99 of each blade body 90 slidably and sealingly engages the frame flange 87a, as further shown in FIG. 14A. As shown in FIG. 16, the lower dimension "R0", which represents the depth of the outlet surface 102, is greater than the upper dimension "R1", which represents the depth of the inlet surface 99a.

Figure 14B:
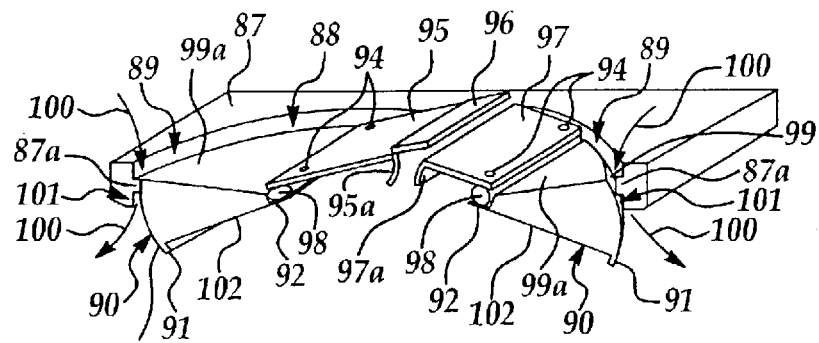
FIG. 14B is a cross-sectional view, taken along section lines 14—14 in FIG. 13, with the valve blades shown in an open position.

As shown in FIGS. 14A and 14B, a generally rectangular top plate 95 is mounted to one of the plate mount shafts 98, typically using the multiple fasteners 94. A generally curved top plate flange 95a extends downwardly along the front edge of the top plate 95, and a plate extension 96 extends forwardly from the top plate 95, above the top plate flange 95a. A generally rectangular bottom plate 97 is mounted to the other of the plate mount shafts 98, and a generally curved bottom plate flange 97a extends downwardly along the front edge of the bottom plate 97. As shown in FIG. 14A, when the valve blades 89 are disposed in the closed position, the rear flanges 91 of the respective blade bodies 90 engage the frame flange 87a of the valve frame 87. The top plate 95 and the bottom plate 97 are in coplanar relationship to each other, with the plate extension 96 engaging the upper surface of the bottom plate 97.

In operation, the throttle valve 85 is used to control the flow of gases 100 from an etch chamber (not shown), through the throttle valve 85 and to a vacuum pump (not shown). Accordingly, as the plate mount shafts 98 are rotated by the stepper motor 20 in stepwise fashion to position the respective valve blades 89 from the closed position of FIG. 14A to the fully-opened position of FIG. 14B, the convex sealing surface 99 of each blade body 90 slidably traverses the concave frame flange 87a. This movement gradually reduces the radius of the circle represented by the two semicircular valve blades 89, thereby gradually increasing the area of the valve opening 88 which is available for flow of the gases 100 through the throttle valve 85. As further shown in FIG. 14B, the gradually-decreasing radius of the valve blades 89 together defines an annular flow gap 101 which does not exist in the closed position of FIG. 14A but gradually increases in width for the flow of the gases 100 at an increasing rate between the blade body 90 and the frame flange 87a, through the gap 101 as the valve blades 89 are rotated by the respective plate mount shafts. 98. Simultaneously, the top plate 95 and the bottom plate 97 angle upwardly as the plate extension 96 disengages the bottom plate 97 and the top plate extension 95a rotates against the bottom plate flange 97a. In a preferred embodiment, the radius of the circle represented by the valve blades 89 is reduced by about 2.5 mm as the valve blades 89 are rotated from the closed position, wherein the outlet surface io2 is disposed at a 0 degree angle with respect to the outlet surface of the valve frame 87, to an open position wherein the outlet surface 102 is disposed at a 37 degree angle with respect to the outlet surface of the valve frame 87.

While the preferred embodiments of the invention have been described above, it will be recognized and understood that various modifications can be made in the invention and the appended claims are intended to cover all such modifications which may fall within the spirit and scope of the invention.

What is claimed is:

1. A throttle valve comprising:
   a valve frame having a valve opening for receiving a gas;
   a pair of semicircular valve blades each including a generally convex sealing surface pivotally mounted in said valve opening for reversibly sealing said valve opening;
   wherein said pair of valve blades can be positioned between a closed position defining a circle of first radius wherein said sealing surface engages said valve frame and opened positions defining ellipses of successively decreasing minor radius less than said first radius wherein said sealing surface disengages said valve frame; and
   a blade positioning mechanism operably engaging said valve blades for positioning said valve blades between said closed position and said opened positions in said valve opening.

2. The throttle valve of claim 1 wherein said pair of valve blades each comprises an outlet surface having a first depth and an inlet surface having a second depth on respective sides of said sealing surface, said first depth greater than said second depth.

3. The throttle valve of claim 1 further comprising a pair of mount shafts spanning said valve opening and operably engaged by said blade positioning mechanism for rotation by said blade positioning mechanism and wherein said pair of valve blades are carried by said pair of mount shafts, respectively.

4. The throttle valve of claim 3 wherein said pair of valve blades each comprises an outlet surface having a first depth and an inlet surface having a second depth on respective sides of said sealing surface, said first depth greater than said second depth.

5. The throttle valve of claim 3 further comprising a top plate carried by one of said pair of mount shafts and a bottom plate carried by the other of said pair of mount shafts and wherein said top plate engages said bottom plate when said valve blades are in said closed position.

6. The throttle valve of claim 5 wherein said pair of valve blades each comprises an outlet surface having a first depth and an inlet surface having a second depth on respective sides of said sealing surface, said first depth greater than said second depth.

7. The throttle valve of claim 5 further comprising a top plate flange carried by said top plate and a bottom plate flange carried by said bottom plate for engaging said top plate flange as said pair of valve blades move between said closed position and said opened positions.

8. The throttle valve of claim 7 wherein said pair of valve blades each comprises an outlet surface having a first depth and an inlet surface having a second depth on respective sides of said sealing surface, said first depth greater than said second depth.

9. The throttle valve of claim 1 further comprising a rear flange carried by each of said pair of valve blades for engaging said valve frame when said pair of valve blades are in said closed position.

10. The throttle valve of claim 9 wherein said pair of valve blades each comprises an outlet surface having a first depth and an inlet surface having a second depth on respective sides of said sealing surface, said first depth greater than said second depth.

11. The throttle valve of claim 9 further comprising a pair of mount shafts spanning said valve opening and operably engaged by said blade positioning mechanism for rotation by said blade positioning mechanism and wherein said pair of valve blades are carried by said pair of mount shafts, respectively.

12. The throttle valve of claim 11 wherein said pair of valve blades each comprises an outlet surface having a first depth and an inlet surface having a second depth on respective sides of said sealing surface, said first depth greater than said second depth.

13. The throttle valve of claim 11 further comprising a top plate carried by one of said pair of mount shafts and a bottom plate carried by the other of said pair of mount shafts and wherein said top plate engages said bottom plate when said valve blades are in said closed position.

14. The throttle valve of claim 13 wherein said pair of valve blades each comprises an outlet surface having a first depth and an inlet surface having a second depth on respective sides of said sealing surface, said first depth greater than said second depth.

15. The throttle valve of claim 13 further comprising a top plate flange carried by said top plate and a bottom plate flange carried by said bottom plate for engaging said top plate flange as said pair of valve blades move between said closed position and said opened positions.

16. The throttle valve of claim 15 wherein said pair of valve blades each comprises an outlet surface having a first depth and an inlet surface having a second depth on respective sides of said sealing surface, said first depth greater than said second depth.

17. A throttle valve comprising:

a valve frame having a valve opening for receiving a gas;

a pair of semicircular valve blades pivotally mounted in said valve opening between first and second positions for sealing said valve opening in said first position;

at least one gas flow gap provided in each of said pair of valve blades for opening said valve opening through said at least one gas flow gap as said pair of valve blades pivots from said first position to said second position; and a blade positioning mechanism operably engaging said valve blades for positioning said valve blades between said first and second positions.

18. The throttle valve of claim 17 wherein said at least one gas flow gap comprises a pair of spaced-apart gas flow gaps each having a generally rectangular cross-section.

19. A throttle valve comprising:

a valve frame having a valve opening for receiving a gas;

a pair of semicircular valve blades pivotally mounted in said valve opening between first and second positions for sealing said valve opening in said first position;

a pair of gas flow gaps provided in each of said pair of valve blades for opening said valve opening through said pair of gas flow gaps as said pair of valve blades pivots from said first position to said second position; and a blade positioning mechanism operably engaging said valve blades for positioning said valve blades between said first and second positions.

20. The throttle valve of claim 19 wherein each of said pair of gas flow gaps has a generally triangular cross-section.

* * * * *